(12) United States Patent
Mary et al.

(10) Patent No.: US 8,498,503 B2
(45) Date of Patent: Jul. 30, 2013

(54) INTEGRATED OPTICAL COUPLER

(75) Inventors: Alexandre Mary, Sassenage (FR);
Salim Boutami, Grenoble (FR); Roch Espiau De Lamaestre, Grenoble (FR);
Jérôme Le Perchec, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 269 days.

(21) Appl. No.: 13/023,619

(22) Filed: Feb. 9, 2011

(65) Prior Publication Data
US 2011/0194804 A1  Aug. 11, 2011

(30) Foreign Application Priority Data
Feb. 9, 2010 (FR) ...................... 10/50890

(51) Int. Cl.
*G02B 6/00* (2006.01)
*G02B 6/34* (2006.01)
*G02B 6/26* (2006.01)
*G02B 6/42* (2006.01)

(52) U.S. Cl.
USPC ........ 385/11; 385/4; 385/27; 385/28; 385/29; 385/37; 385/39; 385/48

(58) Field of Classification Search
USPC ........................ 385/4, 11, 27, 28, 29, 37, 48
See application file for complete search history.

(56) References Cited

U.S. PATENT DOCUMENTS

| 6,097,865 | A | 8/2000 | Alferness |
| 6,473,541 | B1 * | 10/2002 | Ho .................................. 385/15 |
| 6,567,573 | B1 * | 5/2003 | Domash et al. ................. 385/16 |
| 6,763,165 | B1 | 7/2004 | Wesstroem |
| 6,771,857 | B1 * | 8/2004 | Domash et al. ................. 385/37 |
| 2008/0166095 | A1 * | 7/2008 | Popovic et al. ............... 385/126 |

FOREIGN PATENT DOCUMENTS
WO  99/09440 A1  2/1999

OTHER PUBLICATIONS

Wang, Jian, et al., "Fabrication of a new broadband waveguide polarizer with a double-layer 190 nm period metal-gratings using nanoimprint lithography", Journal of Vacuum Science and Technology B: Microelectronicprocessing and Phenomena; American Vacuum Society, NewYork NY US LNKD-DOI:10.1116/1.5909333, vol. 17, No. 6, Nov. 1, 1999, pp. 2957-2960, XP012007855, ISSN: 0734-211X.
Search Report issued in French Patent Application 1050890 on Nov. 2, 2010.

* cited by examiner

*Primary Examiner* — Ryan Lepisto
(74) *Attorney, Agent, or Firm* — Vedder Price PC

(57) ABSTRACT

An integrated optical coupler including in the medium separating a first integrated waveguide from a second substantially parallel integrated waveguide, a succession of strips parallel to one another and orthogonal to the general direction of the waveguides, said strips being made of a material having an absorption preventing the propagation of an electromagnetic wave across its volume, and having:

a length H equal to $k\lambda/2n_{medium}$, where k is an integer, $\lambda$ is the central wavelength used, and $n_{medium}$ is the optical index of the medium between the waveguides;

a period P smaller than $\lambda/2n_{medium}$; and ends at a distance shorter than $\lambda/10$ from the waveguides.

8 Claims, 4 Drawing Sheets

--Prior Art--

--Prior Art--

INTEGRATED OPTICAL COUPLER

BACKGROUND OF THE INVENTION

1. Field of the Invention

The present invention relates to the field of integrated optical components, and more specifically to passive integrated optical components for coupling integrated waveguides, such as polarization splitters, filters, and intensity splitters.

2. Discussion of Prior Art

As illustrated in FIG. 1, a polarization splitter is a device 1 to which are associated an input waveguide 2 and two output waveguides 3 and 4, one of the output guides possibly being an extension of the input guide. This device is intended to extract, from an input waveguide containing transverse electric (TE) and transverse magnetic (TM) modes, at least part of one of the polarization modes, for example, the TM mode in the case shown in FIG. 1.

An example of an integrated polarization splitter which is not associated with waveguides is illustrated in FIG. 2. This polarization splitter is for example described in a paper by Junming Zhao et al. published in Applied Physics Letters 92, 071114 (2008). An incident beam 11 arrives under oblique incidence on the edge of a succession of parallel metal strips 12 formed in an insulating material, and the paper discloses that, for a proper sizing, a reflected beam 13 containing the TE polarization component and a transmitted beam 14 containing the TM polarization of the beam are obtained.

Further, in the field of optical integrated circuits, where waves propagate within waveguides formed inside or on top of a support material, various other types of polarization splitters separating the TE and TM components of the wave carried by an input waveguide between the continuation of this waveguide and another waveguide have been developed, for example, Y-shaped structures or photonic crystal structures.

However, known structures have the disadvantage that the surface necessary for the polarization splitting is relatively large, currently with a length ranging from 10 to 100 times the wavelength of the light which propagates in the waveguides. Further, such structures are often complicated to manufacture and require an extremely accurate sizing of their elements.

SUMMARY OF THE INVENTION

An object of an embodiment of the present invention is to provide a coupler of low bulk, forming a polarization splitter or an intensity splitter.

Another object of an embodiment of the present invention is to provide such a coupler in which the input and output waveguides can be parallel.

Another object of an embodiment of the present invention is to provide a coupler that can be formed by usual integrated optical circuit manufacturing techniques.

To achieve these and other objects, an embodiment of the present provides an integrated optical coupler comprising in the medium separating a first integrated waveguide from a second substantially parallel integrated waveguide, a succession of strips parallel to one another and orthogonal to the general direction of the waveguides, said strips being made of a material having an absorption preventing the propagation of an electromagnetic wave across its volume, and having:

a length H equal to $k\lambda/2n_{medium}$, where k is an integer, $\lambda$ is the central wavelength used, and $n_{medium}$ is the optical index of the medium between the waveguides;

a period P smaller than $\lambda/2n_{medium}$; and ends at a distance shorter than $\lambda/10$ from the waveguides.

According to an embodiment of the present invention, the coupler is used as a polarization splitter, and light comprising orthogonal polarizations, TE and TM, is sent into the first waveguide and at least part of the light of a given polarization, TM, is sent into the second waveguide.

According to an embodiment of the present invention, the coupler is used as an intensity splitter, and light of a given polarization, TM, is sent into the first waveguide and part of the intensity of this light is transferred into the second waveguide.

According to an embodiment of the present invention, the strips are made of metal.

According to an embodiment of the present invention, the input and output strips are more distant, respectively, from the input waveguide and from the output waveguide.

According to an embodiment of the present invention, each waveguide is formed of a core strip made of a material having a first index, surrounded with a material having a lower index.

According to an embodiment of the present invention, the high-index material is silicon and the low-index material is silicon oxide.

The foregoing and other objects, features, and advantages of the present invention will be discussed in detail in the following non-limiting description of specific embodiments in connection with the accompanying drawings.

BRIEF DESCRIPTION OF THE DRAWINGS

For clarity, the same elements have been designated with the same reference numerals in the different drawings and, further, as usual in the representation of integrated circuits, the various cross-section and perspective views are not to scale.

DETAILED DESCRIPTION

The present invention applies to a coupling between integrated waveguides. Phenomena occurring in integrated optics will be considered herein.

Figure 1:
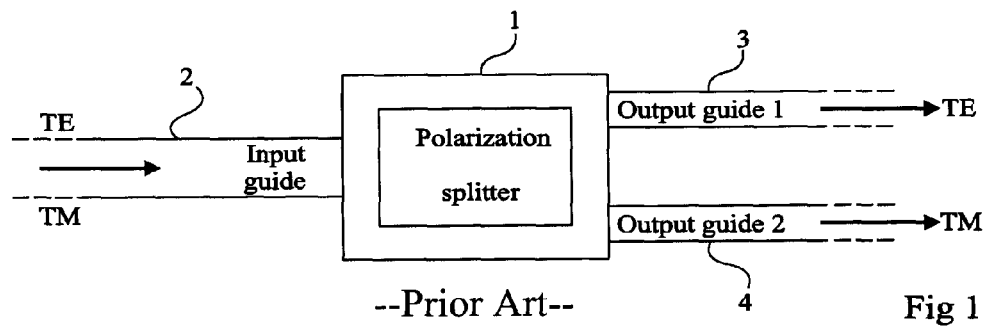
FIG. 1 schematically shows a polarization splitter.
Figure 2:
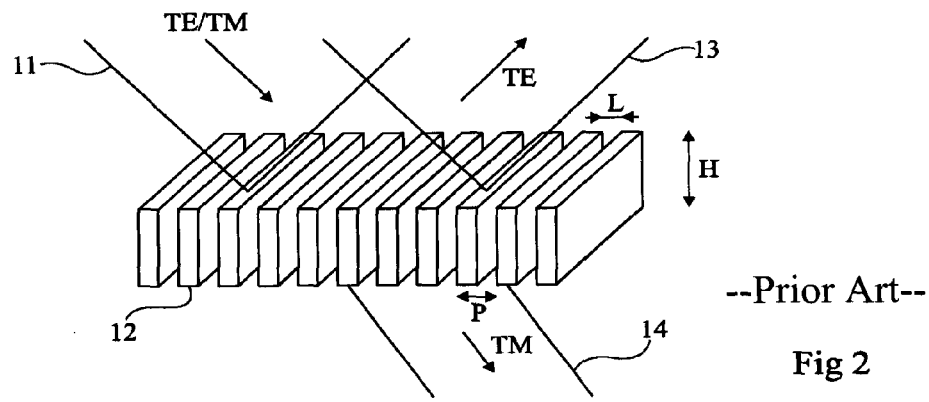
FIG. 2 is a perspective view of a known polarization splitter.
Figure 3:
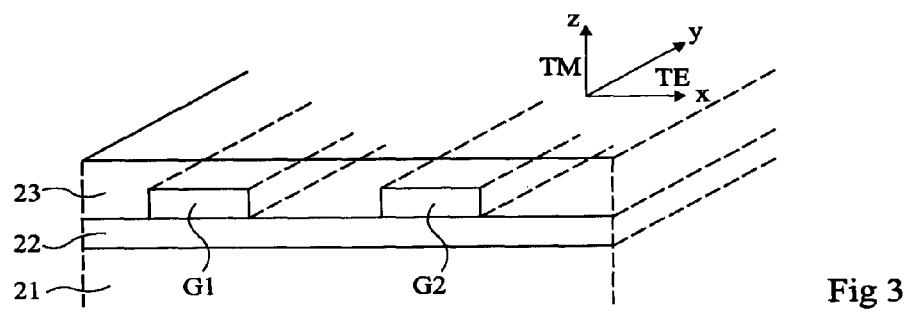
FIG. 3 schematically shows two parallel integrated waveguides.

FIG. 3 shows an embodiment of waveguides in an integrated optical circuit. More specifically, FIG. 1 shows two waveguides G1 and G2 formed of a core made of a material having a first index surrounded with a material having a second index, generally smaller than the first index. FIG. 3 shows an example with an SOI structure in which an insulating layer 22 and a silicon layer 23 where waveguide cores G1 and G2 are etched are laid on a support 21, generally a silicon wafer. The assembly is surrounded with a silicon oxide layer 23. The waveguides extend along direction y and two polarization modes of a wave likely to travel in these waveguides are defined, that is, a TE polarization along the x axis and a TM polarization along the z axis, or conversely. Of course, there exist many other types of waveguides, there may exist graded-index waveguides, or waveguides formed in layers different from those mentioned hereabove. Generally, waveguides have a rectangular cross-section; their large dimension may be parallel to the support, as shown, or perpendicular to the support.

In current structures, the waveguide core dimensions are smaller than the wavelength that they must propagate, that is, for example, on the order of 200×50 nm for a 1.5-μm wavelength. In the rest of the present description, even though the waveguides will be very schematically shown, it should be understood that they correspond to structures such as that in FIG. 3.

Figure 4:
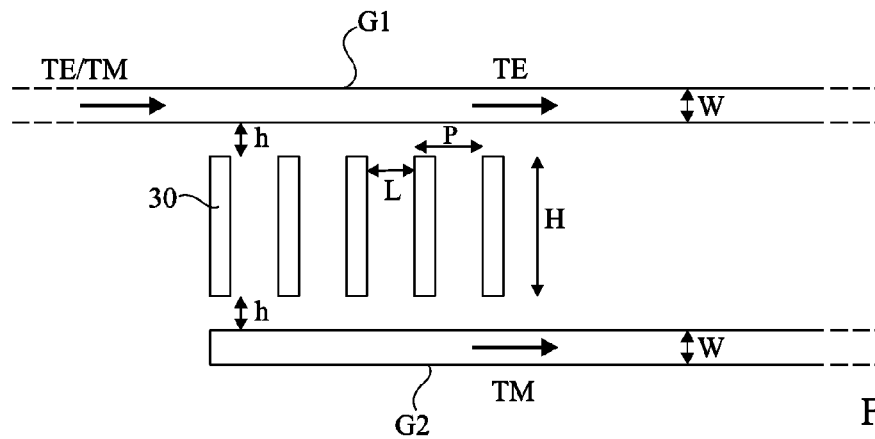
FIG. 4 shows an embodiment of a waveguide coupling device.

FIG. 4 is a simplified top view of a coupling device. Two waveguides G1 and G2 are arranged to be substantially parallel, at a sufficient distance to avoid any direct coupling between them. An assembly of metal strips very close to one another, substantially of same height H in the shown embodiment, is placed between these waveguides 30. The strips are placed at a distance h from each of the guides, are repeated at a period P and are at a distance L from one another.

If value h is sufficiently small, there is an evanescent wave coupling between each waveguide and the structure with parallel strips and said structure couples from waveguide G1 to waveguide G2 a great part of the TM mode, the TE mode remaining in waveguide G1.

Preferably, parameters H, P, L, and h are selected as follows:
- length H is an integral multiple k of the half-wavelength divided by the index of the medium in which the strips are placed, that is, $H=k\lambda/2n_{medium}$;
- period P is smaller than the half wavelength, for example, ranging between $\lambda/8\, n_{medium}$ and $\lambda/2n_{medium}$, distance L between strips being arbitrarily selected; and
- the strip ends are at a distance h from the guides much shorter than one tenth of the central wavelength of the light which propagates in waveguide G1.

FIGS. 5, 6A, 6B, 7A, and 7B are perspective views illustrating various possible embodiments of the strips.

Figure 5:
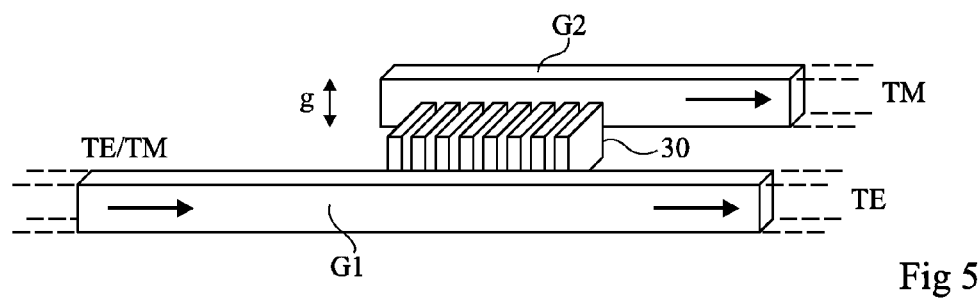
FIGS. 5, 6A, 6B, 7A, 7B are perspective views illustrating different variations of a waveguide coupling device according to embodiments of the present invention.
Figure 6A:
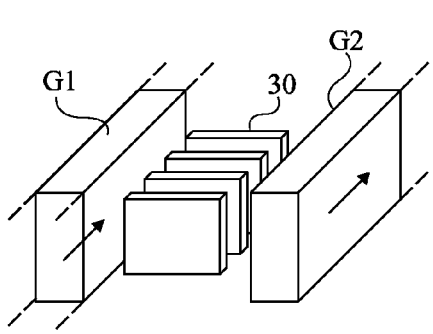
Figure 6B:
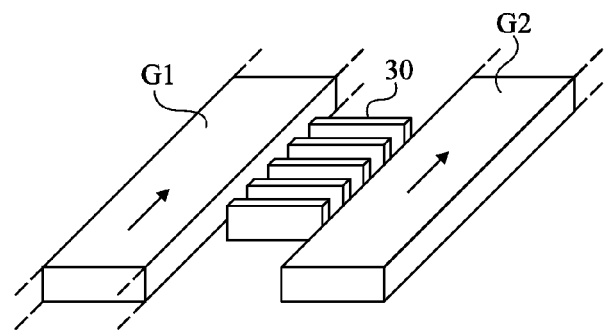

The embodiments of FIGS. 5, 6A, and 6B can be easily understood by simply looking at the drawings.

Figure 7A:
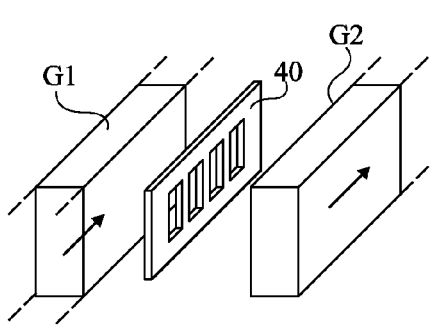
Figure 7B:
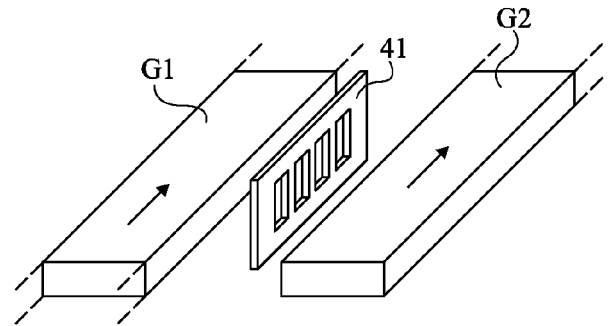

In the case of FIGS. 7A and 7B, rather than providing parallel strips, a grating or perforated plate, 40 in FIGS. 7A and 41 in FIG. 7B, is provided, in which the openings are sized so that, as in the case of parallel strips, a surface-wave coupling occurs (example: plasmon mode, phonons, Zenneck-Sommerfield wave) between the waveguides. In this case, in particular, given that the coupling structure is very thin, it may be desirable to move guides G1 and G2 away from the coupling area to avoid a direct parasitic coupling between the guides.

Figure 8:
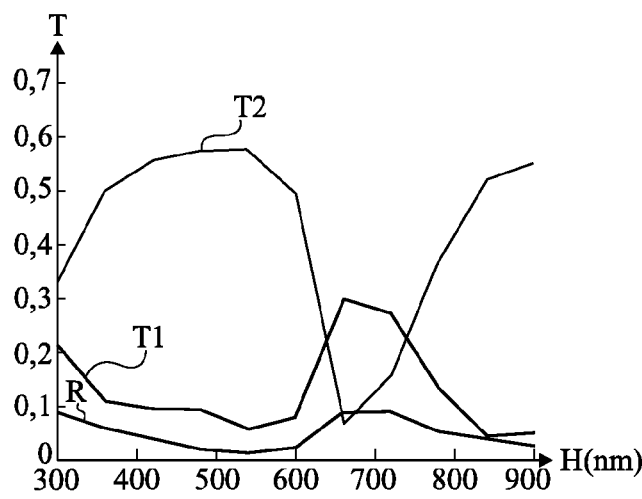
FIG. 8 shows a transmission and reflection curve according to a first parameter.
Figure 9:
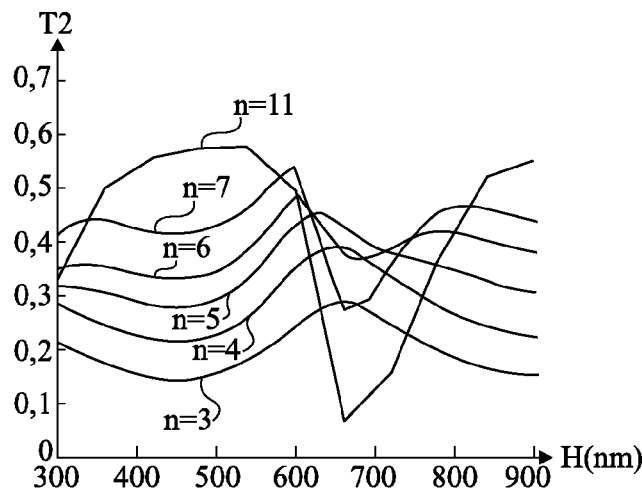
FIG. 9 shows a transmission curve according to a second parameter.
Figure 10:
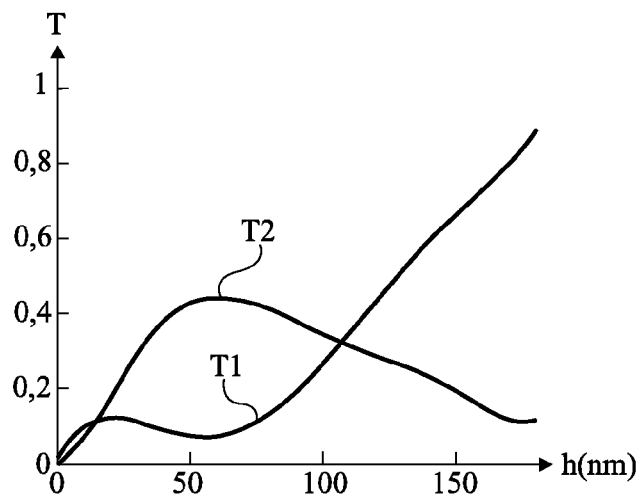
FIG. 10 shows a transmission curve according to a third parameter.

The curves of FIGS. 8, 9, and 10 provide examples of variation of the transmission between guides in various conditions. In these drawings:
- T1 designates the transmission from guide G1 to guide G1, that is, what remains in guide G1 after passing through the coupler;
- T2 designates the transmission from guide G1 to guide G2; and
- R designates the back reflection in guide G1.

It should be noted that part of the incident energy is absorbed in the coupler, which explains why the sum of the output intensities is not equal to the input intensity.

These various curves are drawn in the specific case where the wavelength is 1.5 μm, that is, for light in the close infrared currently used in telecommunications, and for a period of the coupler network equal to 300 nm.

FIG. 8 indicates for polarization mode TM, according to parameter H (length of the wafers), proportion T2 transferred into guide G2, proportion T1 remaining in guide G1, and reflected proportion R. It can be seen that there is a significant transfer (over 50%) of mode TM to waveguide G2 (curve T2) for a rather wide range of values of H (from 400 to 600 nm), and for multiples of these values. Further, within these ranges, only a very small proportion of the TM mode (less than 5%) remains in guide G1. According to an advantage of the provided structure, conversely to most known couplers, there is a wide parameter tolerance. Similarly, satisfactory results are obtained even if values h, P, and L are not strictly respected to within a proportion of at least 20%. The coupler described herein is thus tolerant to manufacturing drifts.

FIG. 9 shows proportion T2 of the TM mode transferred into guide G2 for various numbers n of strips, respectively 3, 4, 5, 6, 7, and 11. The curve of FIG. 8 corresponds to the case of 11 strips. It can be seen that the transferred TM mode proportion is non negligible (greater than 20%) even for four strips only and that a transfer on the order of 60% is obtained for a larger number of strips (n=11). Reminding that the strip period is smaller than $\lambda/2n_{medium}$, if four strips only are used, the longitudinal bulk of the coupler described herein will be much smaller than the wavelength while in known devices, this bulk is of at least from 10 to 100 times the wavelength.

FIG. 10 shows transfer rates T1 and T2 for the TM mode from waveguide G1 to itself and from waveguide G1 to waveguide G2 according to distance h between the limit of the previously-described strips and each waveguide. Once again, it can be seen that h may be selected within a relatively wide range, from 40 to 70 nm for λ=1.5 μm.

Figure 11:
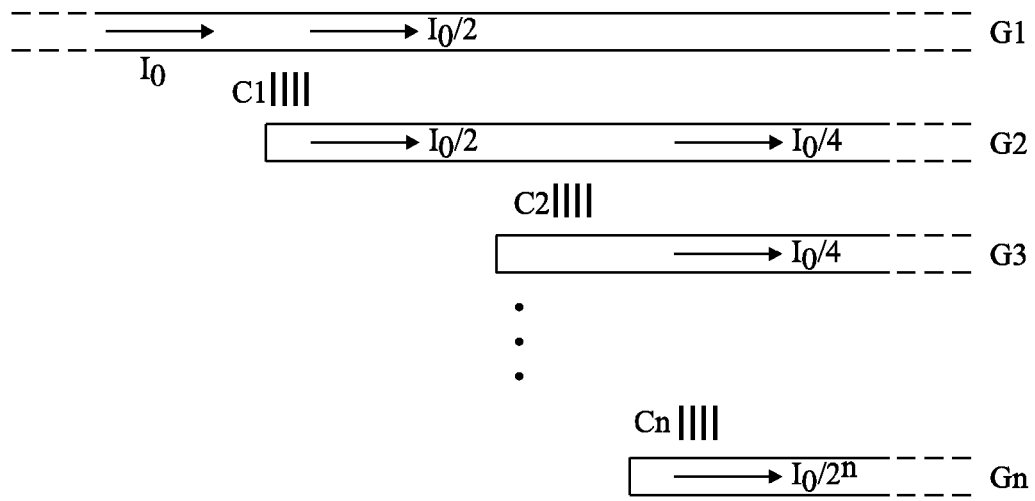
FIG. 11 illustrates a splitter according to an embodiment of the present invention.

A coupler essentially operating as a polarization splitter has been described up to now. It should be noted that this device may also be used as an intensity splitter. As shown in FIG. 11, if a TM polarized wave is sent into waveguide G1, a first coupler C1 may be selected so that 50% of intensity $I_0$ of the TM mode passes into a waveguide G2. There thus is an intensity splitting $I_0/2$ between each of guides G1 and G2. Similarly, successive splittings may be performed until an intensity $I_0/2^n$ is obtained in a guide Gn.

Figure 12:
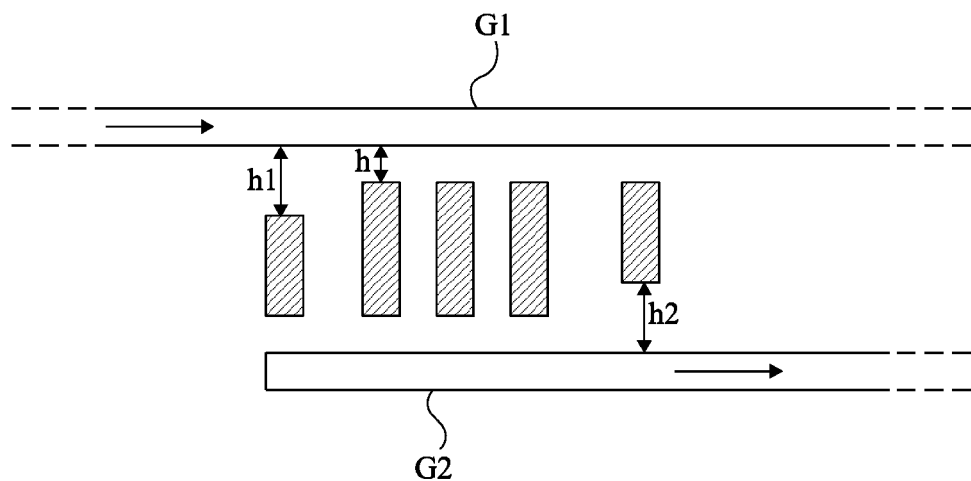
FIG. 12 shows a variation of a coupler according to an embodiment of the present invention.

Further, regular strip gratings have been described up to now. It should be noted that the grating may be irregular to be more tolerant in terms of wavelength and/or to avoid stray reflections in the input guide. A structure such as that in FIG. 12 in which the coupler comprises on the input side of guide G1 a first shorter strip, that is, at a distance h1>h from guide G1 may for example be used. Similarly, the last strip will preferably be at a distance h2>h from guide G2. This decreases for the wave arriving from guide G1 and for the wave entering guide G2 the effective index discontinuity and enables to avoid reflections. Similar results could be obtained by selecting variable distances between strips on the input and output sides of the coupler.

The forming of a device such as previously described will be relatively easy to implement by means of usual integrated circuit manufacturing techniques. For example, once waveguides G1 and G2 have been defined (see FIG. 3), a succession of grooves may be etched in the medium separating said guides and these grooves may be filled with a metal such as copper, aluminum, gold, or silver.

Although the present invention has been more specifically described in reference to specific materials, it will be within the abilities of those skilled in the art to select the materials adapted to the considered wavelength ranges to form waveguides and couplers with metal strips such as described herein.

Only metal strips have been mentioned herein, which corresponds to the preferred material in the visible and infrared range. Generally, such strips (or gratings) will generally be made of a material with an absorption preventing the propagation of an electromagnetic wave across its volume. For example, in the ultraviolet range, the strips may be made of silicon or of an organic polymer and, in the terahertz range, the strips may be made of a semiconductor (ex: InSb) or of ionic compounds such as SiC.

Various embodiments with different variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An integrated optical coupler comprising in a medium separating a first integrated waveguide (G1) from a second substantially parallel integrated waveguide (G2), a succession of strips (30) parallel to one another and orthogonal to the general direction of the waveguides, said strips being made of a material having an absorption preventing the propagation of an electromagnetic wave across its volume, and having:
   a length H equal to $k\lambda/2n_{medium}$, where k is an integer, $\lambda$ is the central wavelength used, and $n_{medium}$ is the optical index of the medium between the waveguides;
   a period P smaller than $\lambda/2n_{medium}$; and
   ends at a distance h shorter than $\lambda/10$ from the waveguides.

2. The coupler of claim 1, used as a polarization splitter, wherein light comprising orthogonal polarizations, TE and TM, is sent into the first waveguide and at least part of the light of a given polarization, TM, is sent into the second waveguide.

3. The coupler of claim 1, used as an intensity splitter, wherein light of a given polarization, TM, is sent into the first waveguide and part of the intensity of this light is transferred into the second waveguide.

4. The coupler of claim 1, wherein said strips are made of metal.

5. The coupler of claim 1, wherein an end of an input strip is more distant from the first waveguide and an end of an output strip is more distant from the second waveguide.

6. The coupler of claim 1, wherein each waveguide is formed of a core strip made of a material having a first index, surrounded with a material having a lower index.

7. The coupler of claim 6, wherein the high-index material is silicon and the low-index material is silicon oxide.

8. The coupler of claim 1, wherein the length H, period P and distance h have a tolerance of 20%.

* * * * *